D. W. HUNT.
MACHINE FOR KYANIZING WOOD.
No. 6,848. Reissued Jan. 11, 1876.
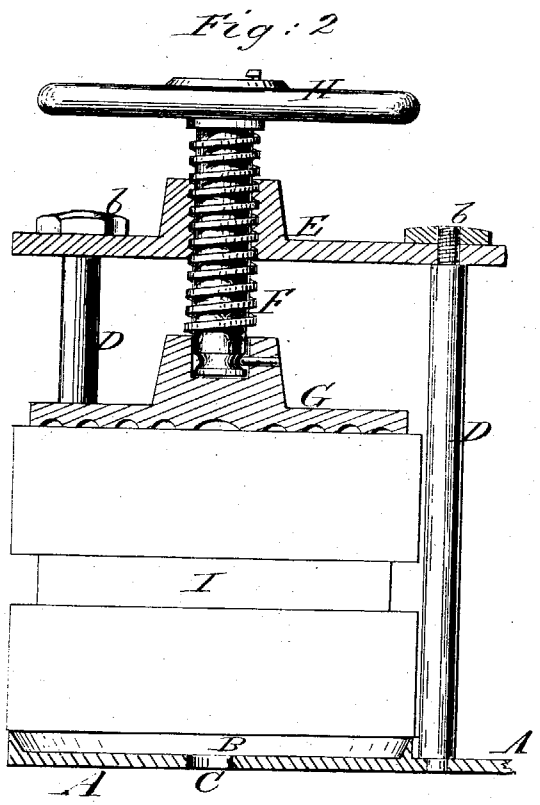
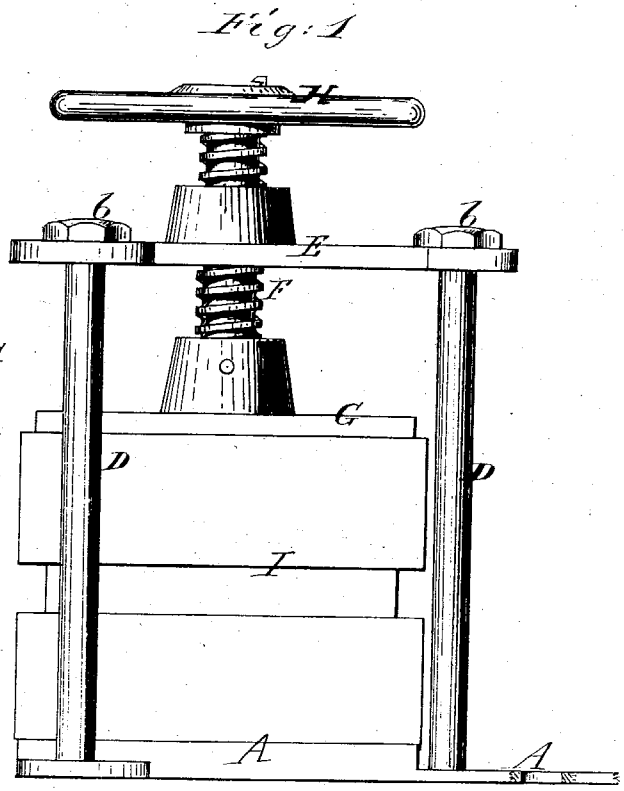
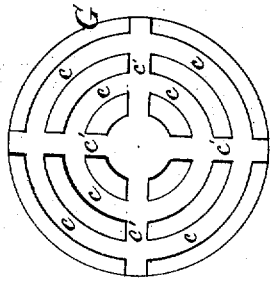
Witnesses.
Jas. Slater,
Silas H. LaRue
Inventor.
David W. Hunt
by Mason Fenwick & Lawrence

BEST AVAILABLE COPY

DAVID W. HUNT, OF SAN FRANCISCO, CALIFORNIA, ASSIGNOR, BY MESNE ASSIGNMENTS, TO THE NATIONAL TIMBER-PRESERVING COMPANY OF CONNECTICUT.

IMPROVEMENT IN MACHINES FOR KYANIZING WOOD.

Specification forming part of Letters Patent No. 91,848, dated June 29, 1869; antedated June 22, 1869; reissue No. 6,848, dated January 11, 1876; application filed November 2, 1875.

*To all whom it may concern:*

Be it known that I, DAVID W. HUNT, of San Francisco, in the county of San Francisco and State of California, have invented a new and useful Machine for Treating Wood with any agent which will increase its durability; and I do hereby declare that the following is a full, clear, and exact description of the same, reference being had to the accompanying drawings forming part of this specification, in which—

Figure 1 is a side elevation, and Fig. 2 a vertical section, of my invention. Fig. 3 is an inner face view of one of the end plates of the machine.

The object of my invention is to effect the introduction of preserving agents into wood, in a direction with the fibers and pores thereof, by hydraulic or other pressure.

The nature of my invention consists, mainly, in an end plate, which is perforated and adapted to form a tight joint between itself and the receiving end of a piece of timber, and which, when the timber is in working relation to it, will be in relief from the timber, except at its edges, so that the preserving fluid, or other preserving agent under hydraulic or other pressure, will be distributed over more or less of the end of the piece of timber, and also forced into the timber in the direction of its fibers and pores, either throughout the whole or a portion of the length of the piece being treated with the preserving agents.

Another main feature of my invention is the combination, with the aforesaid perforated end plate, of an adjustable end plate adapted to be fitted against the discharging end of the piece of timber being treated, by means of which a tight joint between the receiving end of the piece of timber can be made and retained during the operation of treating it with preserving agents, and also pieces of timber of different lengths may be confined or dogged between the two plates; and another main feature of my invention is the combination of an end plate having eduction passages or channels and an end plate having a receiving-passage, whereby the preserving agent can be forced through the timber and allowed to pass off into the atmosphere or receiver. Fourth, it consists in other certain details of construction and combinations of parts, as will be hereinafter described and specifically claimed.

In the accompanying drawings I have shown an upright screw-clamping frame or machine, adapted particularly for treating "blocks" of wood; but, in the general use of my invention, such as for treating long timbers for posts and other structures, along a portion or the whole of their length, a cap secured to the end of the piece of timber may be employed, and the connections between the clamp and the cap made of the desired length.

A is a base or end plate, which may be provided with suitable holes or openings for anchoring it in position. *a a* is a flange extending beyond the surface of the plate, so as to form a chamber, B, of dishing form. The inner side of this flange is beveled, so that at the top it presents a sharp edge. The chamber B, inclosed by the beveled flange *a a*, serves as a receiver and diffuser of the fluid or preserving agent which is to be forced into the wood. This chamber is of nearly the same area as the end of the block, in order that the fluid or other agent may be driven through the pores near the outside of the block, as well as at the center and between the center and outside surface. In the center of the dished or chambered portion a hole or opening, C, is made completely through the plate. D D D are posts or stays screwed into the plate A outside of the dished portion, and support a plate, E, which is held by nuts *b b b* on the ends of the posts or stays. A vertical screw, F, passes through the plate E, and on its top is a hand-wheel, H, for turning it. G is another end plate, with corrugated or grooved face, and attached to the lower end of the screw. This plate presses upon the other end of the stick or block of wood. A cam-lever may be substituted for the screw F for producing pressure. The piece of wood, I, to be treated is placed upon end on the sharp-edged projection or flange on the plate A, and the screw turned down upon it until a water-tight joint is had around the lower end of the block, 71 3

BEST AVAILABLE COPY but not so far down as to cause the end of the block to touch the surface of the plate A. In the hole through the plate A a pipe is introduced, which is connected with a force-pump provided with a stop-cock, and charged with the necessary solution or filled with fluid, such as oil, petroleum, arsenic, sulphate of zinc, carbolic acid, salt pickle, creosote, or any other preserving substance, which drives the sap in the wood up to the top of the block and into grooves *c c*, where it passes off by means of transverse slots *c' c'* and opens the pores, while the solution is forced up into the timber. By an ordinary pressure the solution will be forced into the end of the block or stick of timber about four feet, which will be sufficient for posts that are to be set in the ground; but by a greater forcing power the distance may be increased to a great length.

For preserving that portion of the ends of long timbers used in building brick structures that are placed in the wall a cap may be secured by clamps to the end of the stick and the fluid forced into the wood three or four feet, or a sufficient distance to preserve it from the damp of the wall.

With two hundred of my machines, which can be constructed at a small cost, set in rows and connected to one pump, twelve hundred blocks of wood may be treated in one hour, allowing each piece to remain in the frame ten minutes. For treating long timbers the machine will be made of the desired length.

Having thus described my invention, what I claim, and desire to secure by Letters Patent, is—

1. An end plate or cap having a sharp-edged flange for forming a tight joint, and a fluid-diffusing chamber between the plate and the wood, said plate being perforated and used in connection with wood-preserving fluids or agents, which are inducted to one end of the wood under hydraulic or other pressure applied by power-machines with such force that they are compelled to pass partly or wholly through the wood in a direction with the pores and fibers thereof, substantially as described.

2. An end plate at the receiving end of a piece of wood, and having an induction-passage in it for the preserving agent to flow through, in combination with an adjustable end plate at the opposite end of the wood, substantially as and for the purposes described.

3. The combination of an end plate, constructed with eduction passages or channels, with an end plate constructed with an induction-passage, substantially as and for the purposes described.

4. The sharp edge *a a* on the flange of the perforated plate A, substantially as and for the purpose described.

Witness my hand in matter of application for reissue of the patent granted me June 29, 1869, No. 91,848.

DAVID WOODWELL HUNT.

Witnesses:

N. PROCTOR SMITH,

R. C. HOOKER.